(12) United States Patent
Alon et al.

(10) Patent No.: US 6,314,071 B1
(45) Date of Patent: Nov. 6, 2001

(54) METHOD AND APPARATUS FOR READING MULTIPLE TRACKS AND WRITING AT LEAST ONE TRACK OF AN OPTICAL DISK

(75) Inventors: Amir Alon, Sunnyvale, CA (US); Tatiana Kosoburd, Lod (IL); Shlomo Shapira, Petach-Tikva (IL); Michael Naor, Rehovot (IL); Joseph Kedmi, Jerusalem (IL)

(73) Assignee: Zen Research (Ireland), Ltd., Dublin (IE)

( * ) Notice: Subject to any disclaimer, the term of this patent is extended or adjusted under 35 U.S.C. 154(b) by 0 days.

(21) Appl. No.: 09/026,736

(22) Filed: Feb. 20, 1998

(51) Int. Cl.$^7$ ........................................ G11B 7/09
(52) U.S. Cl. .................. 369/53.37; 369/116; 369/112; 369/44.27; 369/44.37
(58) Field of Search ................ 369/44.27, 44.38, 369/116, 112, 100, 44.37, 13, 54, 53.37, 53.45

(56) References Cited

U.S. PATENT DOCUMENTS

| | | |
|---|---|---|
| 3,744,039 | 7/1973 | Hrbek et al. .......................... 340/173 |
| 4,000,493 | 12/1976 | Spaulding et al. ........................ 346/1 |

(List continued on next page.)

FOREIGN PATENT DOCUMENTS

| | | |
|---|---|---|
| 0 092 420 A1 | 2/1983 | (EP) . |
| 0 388 760 A1 | 9/1990 | (EP) . |
| 0 441 435 A1 | 8/1991 | (EP) . |
| 0 588 575 A2 | 3/1994 | (EP) . |
| 0 598 611 A2 | 5/1994 | (EP) . |
| 0 630 002 A1 | 12/1994 | (EP) . |
| 0 643 388 A1 | 3/1995 | (EP) . |

OTHER PUBLICATIONS

Ken C. Pohlmann, "The Compact Disc Handbook," A–R Editions Inc., pp. 108–115, 1992.

*Primary Examiner*—Thang V. Tran
(74) *Attorney, Agent, or Firm*—Fish & Neave; Nicola A. Pisano; Michael J. DeHaemer, Jr.

(57) ABSTRACT

The present invention provides an optical system having a read mode, during which multiple tracks of an optical disk are simultaneously read, and a write mode, during which data is written to at least one track of the optical disk. The multiple light beams employed during read mode may be generated by a single laser diode operated at low power used in combination with a diffractive element, multiple laser diodes, or combinations thereof.

13 Claims, 6 Drawing Sheets

U.S. PATENT DOCUMENTS

| | | | |
|---|---|---|---|
| 4,283,777 | 8/1981 | Curry et al. | 369/32 |
| 4,298,974 | 11/1981 | Tsunoda et al. | 369/45 |
| 4,363,116 | 12/1982 | Kleuters et al. | 369/30 |
| 4,449,212 | 5/1984 | Reno | 369/44 |
| 4,459,690 | 7/1984 | Corsover et al. | 369/44 |
| 4,689,781 | 8/1987 | Ando | 369/112 |
| 4,703,408 | 10/1987 | Yonezawa et al. | 369/44 |
| 4,727,528 | 2/1988 | Wyland | 369/33 |
| 4,754,446 | 6/1988 | Reno | 369/112 |
| 4,766,582 | 8/1988 | Ando | 369/45 |
| 4,815,067 | 3/1989 | Webster et al. | 369/97 |
| 4,890,272 | 12/1989 | Ando | 369/45 |
| 4,982,395 | 1/1991 | MacAnally | 369/44.37 |
| 4,993,011 * | 2/1991 | Torazawa et al. | 369/44.37 |
| 5,105,407 | 4/1992 | Ishika | 369/44.37 |
| 5,105,410 | 4/1992 | Maeda et al. | 369/44.37 |
| 5,128,919 | 7/1992 | Narahara et al. | 369/97 |
| 5,130,965 | 7/1992 | Karaki et al. | 369/44.38 |
| 5,144,616 | 9/1992 | Yasukawa et al. | 369/122 |
| 5,153,863 * | 10/1992 | Noda et al. | 369/44.37 |
| 5,155,719 | 10/1992 | Masakawa | 369/48 |
| 5,155,721 | 10/1992 | Yoda et al. | 369/110 |
| 5,239,529 | 8/1993 | Tobita et al. | 369/48 |
| 5,365,535 | 11/1994 | Yamaguchi | 372/38 |
| 5,426,623 | 6/1995 | Alon et al. | 369/32 |
| 5,457,670 | 10/1995 | Maeda et al. | 369/44.28 |
| 5,465,243 | 11/1995 | Boardman et al. | 369/49 |
| 5,469,418 | 11/1995 | Satoh et al. | 369/54 |
| 5,475,665 | 12/1995 | Tani et al. | 369/44.38 |
| 5,483,511 | 1/1996 | Jewell et al. | 369/44.37 |
| 5,495,461 | 2/1996 | Komma et al. | 369/103 |
| 5,508,990 | 4/1996 | Nagasaki et al. | 369/60 |
| 5,511,051 | 4/1996 | Rokutan et al. | 369/44.28 |
| 5,526,182 | 6/1996 | Jewell et al. | 359/621 |
| 5,555,539 | 9/1996 | Kamisada et al. | 369/219 |
| 5,561,654 | 10/1996 | Hamilton et al. | 369/97 |
| 5,566,150 * | 10/1996 | Reno | 369/44.37 |
| 5,572,493 | 11/1996 | Maeda et al. | 369/44.28 |
| 5,583,836 | 12/1996 | Rokutan et al. | 369/44.28 |
| 5,592,444 | 1/1997 | Alon et al. | 369/13 |
| 5,608,716 | 3/1997 | Koyama et al. | 369/275.1 |
| 5,619,488 | 4/1997 | Ota et al. | 369/112 |
| 5,627,805 | 5/1997 | Finkelstein et al. | 369/32 |
| 5,650,835 | 7/1997 | Matic | 349/201 |
| 5,663,940 | 9/1997 | Horimai et al. | 369/44.23 |
| 5,808,986 | 9/1998 | Jewell et al. | 369/44.37 |
| 5,835,471 | 11/1998 | Miyamoto et al. | 369/109 |
| 5,907,526 | 5/1999 | Alon et al. | 396/32 |
| 94 19796 | 9/1994 | (WO) . | |

\* cited by examiner

METHOD AND APPARATUS FOR READING MULTIPLE TRACKS AND WRITING AT LEAST ONE TRACK OF AN OPTICAL DISK

FIELD OF THE INVENTION

The present invention relates to optical disk drives which can read and write optical disks. More specifically, the present invention provides a multi-beam optical system for simultaneously reading multiple tracks of an optical disk, and for writing at least one track of the optical disk.

BACKGROUND OF THE INVENTION

Due to their high storage density, long data retention life, and relatively low cost, optical disks have become the predominant media format for distributing information. Large format disks, and more recently, DVD disks, have been developed for storing full length motion pictures. The compact disk (CD) format was developed and marketed for the distribution of musical recordings and has replaced vinyl records. High-capacity, read-only data storage media, such as CD-ROM and DVD-ROM, have become prevalent in the personal computer field, and the DVD format may soon replace videotape as the distribution medium of choice for video information.

Recently, relatively inexpensive optical disk writers and writable optical media have become available, making optical disks popular as backup and archival storage devices for personal computers. The large storage capacity of writable optical disks also makes them ideal for use in multimedia authoring and in other applications which require access to large amounts of storage. Current writable optical disk technologies include several write-once technologies, such as CD-Recordable (CD-R) and DVD-Recordable (DVD-R); a few technologies permit writing, erasing, and rewriting data on a disk, such as Mini-Disk (MD), which uses magneto-optical technology; still others use phase-change and dye-polymer technology. Recent advances in writable optical disk technology have made rewritable optical media more practical, and the specification for DVD-RAM calls for use of high-capacity rewritable optical media.

An optical disk is made of a transparent disk or substrate in which data, in the form of a serial bit-stream, are encoded as a series of pits in a reflective surface within the disk. The pits are arranged along a spiral or circular track. Data are read from the optical disk by focusing a low power laser beam onto a track on the disk and detecting the light reflected from the surface of the disk. By rotating the optical disk, the light reflected from the surface of the disk is modulated by the pattern of the pits rotating into and out of the field of laser illumination. Optical and imaging systems detect the modulated, reflected, laser light and produce an electrical signal that is decoded to recover the digital data stored on the optical disk.

Data is typically recorded on writable optical disks by using a higher power laser than is used for reading. The media for use with optical disk writers typically includes a recording layer, made of a material which changes its optical characteristics in response to the presence of the beam from the high power laser. The high power laser is used to create "pits" in the recording layer which have a different reflectivity than surrounding areas of the disk, and which can be read using a lower power reading beam. In systems having the ability to erase and re-record data, a laser having a power output between the low power used for reading and the high power used for writing may be used to erase data. Alternatively, some systems employ a laser which outputs a different wavelength of light to erase data from the optical media. The methods used to write and erase optical disks depend on the type of recordable media being used.

To write or retrieve data from an optical disk, the foregoing optical systems include a pickup assembly which may be positioned to read or write data on any disk track. Servo mechanisms are provided for focusing the optical system and for keeping the pickup assembly positioned over the track, despite disk warpage or eccentricity.

Because in most previously known systems the data are read from the disk serially, i.e. one bit at a time, the maximum data transfer rate for an optical disk reader is determined by the rate at which the pits pass by the pickup assembly. The linear density of the bits and the track pitch are fixed by the specification of the particular optical disk format. For example, CD disks employ a track pitch of 1.6 $\mu$m, while DVD employs a track pitch only about one-half as wide.

Previously known methods of increasing the data transfer rate of optical disk readers and writers have focused on increasing the rate at which the pits pass by the pickup assembly by increasing the rotational speed of the disk itself. Currently, constant linear velocity (CLV) drives with rotational speeds of up to 16× standard speed are commercially available, and even faster reading speeds have been achieved using constant angular velocity designs. Higher disk rotational speeds, however, place increasing demands on the optical and mechanical subsystems within the optical disk player, create greater vibration, and may make such players more difficult and expensive to design and manufacture. Higher rotation speeds also make accurately writing data to a disk more difficult, so few CD-R systems are available that record at faster than 4× the standard speed.

A cost effective alternative to increasing the disk rotational speed to provide faster optical disk readers is to read multiple data tracks simultaneously, as described in commonly assigned U.S. Pat. No. 5,426,623 to Alon et al. In accordance with the methods and apparatus provided therein, for example, ten adjacent data tracks may be read simultaneously. Thus, even if the disk is rotated at only 4× the standard speed, the capability to read ten tracks simultaneously provides the equivalent of a 40× drive.

It should be noted that as used herein, a data track is a portion of the spiral data track of a typical optical compact disk which follows the spiral for one rotation of the disk. Thus, a drive capable of reading multiple data tracks simultaneously reads multiple such portions of the spiral data track at once. For optical disks having concentric circular tracks, a data track would refer to one such circular track. For disks having multiple concentric spiral tracks, such as those described in commonly assigned, copending U.S. patent application Ser. No. 08/885,425, a data track would refer to one of the concentric spiral tracks.

One way in which a drive capable of reading multiple data tracks simultaneously may be implemented is through use of multiple beams, arranged so that each beam illuminates a single data track on the disk. U.S. Pat. No. 5,144,616 to Yasukawa et al. shows a system in which multiple laser diode emitters are used to provide multiple beams. Other methods may also be used to provide multiple beams. U.S. Pat. No. 4,459,690 to Corsover, for example, describes a multi-beam system in which an illumination beam generated by a single laser source is split into multiple beams using an acousto-optic device that dithers the beam in a direction normal to the track direction.

The beams in a multi-beam optical pickup may also be provided by using a diffractive element to split a single beam into multiple beams. This technique is used to generate the beams in a three-beam tracking system, as shown in *The Compact Disc Handbook*, Pohlmann, K., 2nd ed., A-R Editions, 1992, pp. 108–115. In commonly assigned, copending U.S. patent application Ser. No. 08/911,815, a diffractive element is used to split an illumination.beam into a plurality of reading beams. Through careful design, it is possible to produce a diffractive element capable of generating multiple beams having the proper spacing to align with the data tracks of an optical disk.

These methods of increasing the speed by handling multiple tracks at once have generally only been used for optical disk readers, since writing multiple tracks of an optical disk simultaneously presents greater challenges. For example, whereas an optical disk reader which reads multiple tracks simultaneously must provide illumination for multiple tracks, an optical disk writer which writes multiple tracks simultaneously must control multiple lasers, which must be individually modulated according to the data being written.

Optical disk writers and readers are typically combined, so that the same drive may be used both to read and write optical disks. Such drives, however, are generally not as fast at reading optical disks as are typical optical disk readers. Many of the enhancements which increase the speed of optical disk readers are difficult to apply in a system which also writes optical disks. Fast CD-R drives are typically capable of recording at 4× speed and reading at 8× speed, while CD-ROM readers with speeds of 16× and faster (using constant linear velocity) are readily available. Consumers are thus left with a choice of purchasing a high speed CD-ROM reader, or a relatively low.speed drive which can both read and write CD-ROMs.

It would therefore be desirable to provide an optical drive with the capability of reading optical disks at high speed, and of writing optical disks with at least the same speed as current optical disk writers.

It also would be desirable to provide an optical drive with the capability of reading optical multiple tracks of an optical disk simultaneously, while also providing the capability to write data to an optical disk.

SUMMARY OF THE INVENTION

In view of the foregoing, it is an object of the present invention to provide an optical system for an optical drive capable of writing optical disks, and of reading optical disks at high speed.

It is also an object to this invention to provide an optical drive with the capability of reading multiple tracks of an optical disk simultaneously, while also providing the capability to write data to an optical disk.

These and other objects of the present invention are achieved by providing an optical system that uses multiple light beams to simultaneously read multiple tracks of an optical disk during a read mode of operation, and at least one light beam to write a track of a writable optical disk during a write mode of operation.

An optical system constructed in accordance with the present invention preferably employs a laser diode capable of generating a low power light beam in a read mode of operation and a higher power light beam in a write mode of operation. A processor, either a specially programmed general purpose processor or an application specific integrated circuit, controls the power supplied to the laser diode to select either the read mode or write mode. A diffractive element may be employed to split the low power beam into multiple beams, thus enabling multiple tracks to be read simultaneously. In other embodiments, additional laser diodes, each capable of generating a low power reading beam, may be employed for simultaneously reading additional tracks, and may be used either with or without diffractive elements.

In further alternative embodiments, separate laser diodes may be provided, wherein a first laser diode and diffractive element (or plurality of laser diodes), is used during read mode operation, and a second laser diode is used to produce a high power writing beam during write mode operation.

Additional alternative embodiments use multiple laser diodes in combination with a diffractive element to provide multiple writing beams during write mode, and multiple reading beams during read mode.

BRIEF DESCRIPTION OF THE DRAWINGS

Further features of the invention, its nature and various advantages will be more apparent from the accompanying drawings and the following detailed description of the preferred embodiments, in which.

DETAILED DESCRIPTION OF THE INVENTION

The description of the present invention provided herein is organized as follows: first, a previously known optical pickup that generates multiple reading beams from a single light source is described as background for the present invention. The modification of such a previously known system to construct apparatus in accordance with the present invention is then described. Several illustrative alternative embodiments of the invention are then disclosed.

Figure 1:
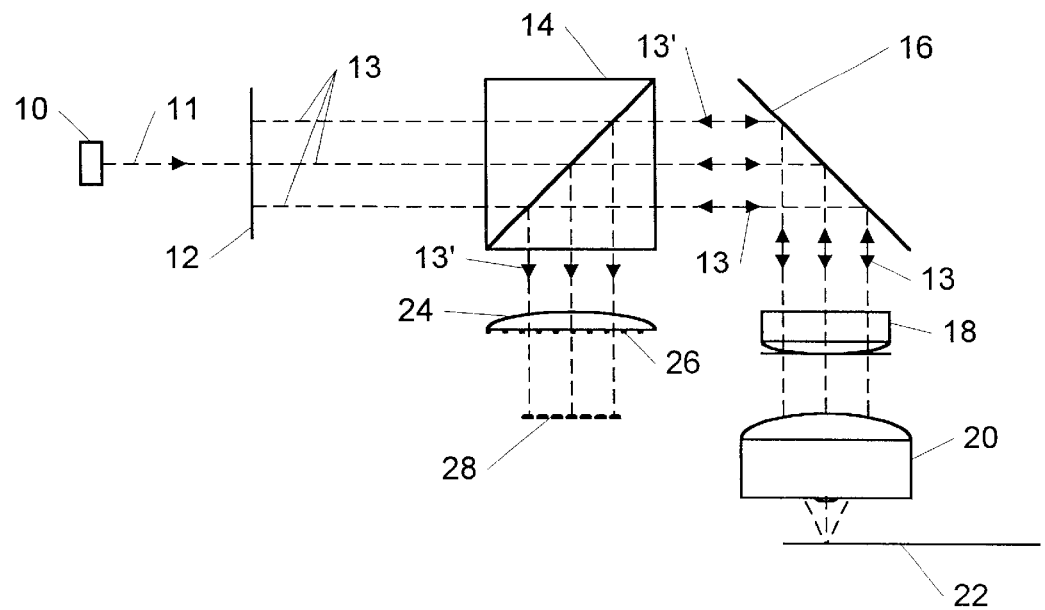
FIG. 1 is a block diagram of a previously known optical pickup using multiple beams to read multiple tracks of an optical disk simultaneously.

Referring to FIG. 1, a previously known multi-beam optical pickup that employs a diffractive element to generate multiple reading beams is described. Such a system is described in commonly assigned, copending U.S. patent application Ser. No. 08/911,815. Laser diode 10 generates illumination beam 11 that passes through diffractive element 12 and is split into a plurality of reading beams 13. Reading beams 13 pass through beamsplitter 14, and are reflected by mirror 16 toward collimator 18 and objective 20, which focusses the beams onto a surface of optical disk 22.

Reading beams 13 are reflected from a data-bearing surface of optical disk 22, modulated by the data recorded on a plurality of tracks of optical disk 22 to form light beams 13'. The reflected, modulated beams 13' gain pass through objective 20 and collimator 18, and are directed back to beamsplitter 14 by mirror 16. Beamsplitter 14 directs beams 13' through tube lens 24 and holographic element 26 onto detector array 28. Detector array 28 comprises a plurality of photo-detector elements 29. Each photo-detector element 29 detects the modulation of a corresponding light beam 13' to thereby read the data from a track of the optical disk. Signals output by detector array 28 also may be used to detect errors in the focus and tracking of the optical disk reader.

A multi-beam optical disk reader, as described above, is capable of achieving very high speeds when reading an optical disk. A seven beam reader, for example, which rotates the disk at 8× standard speed, would provide a data rate equivalent to a 56× drive. Thus, simultaneously reading multiple tracks of an optical disk provides significant increases in data reading rates at relatively low spindle speeds, as compared to optical systems that read a single track.

Previously known optical disk writing systems employ an optical path similar to that shown in FIG. 1, except only a single beam is typically used, and diffractive element 12 is omitted. Instead of reading data from the disk, an optical disk writer pulses the laser diode on and off to write data to the disk. The laser diode used in an optical disk writer is capable of generating a higher power beam than the laser diode of an optical disk reader. For example, while reading may require a light beam having a power of 0.5 mW, writing data to an optical disk may require a light beam having a power in the range of 12 to 14 mW, depending upon the specific technology employed. Many optical disk writers also may produce a light beam having an intermediate power used to erase areas of the writable optical media. Such a light beam may, for example, have a power of 10 mW.

In accordance with the present invention, a multi-beam optical disk reader is provided that is capable of simultaneously reading multiple tracks of data during a read mode of operation, as described with respect to FIG. 1, and which also provides the capability to write data to writable optical media during a write mode of operation.

Figure 2:
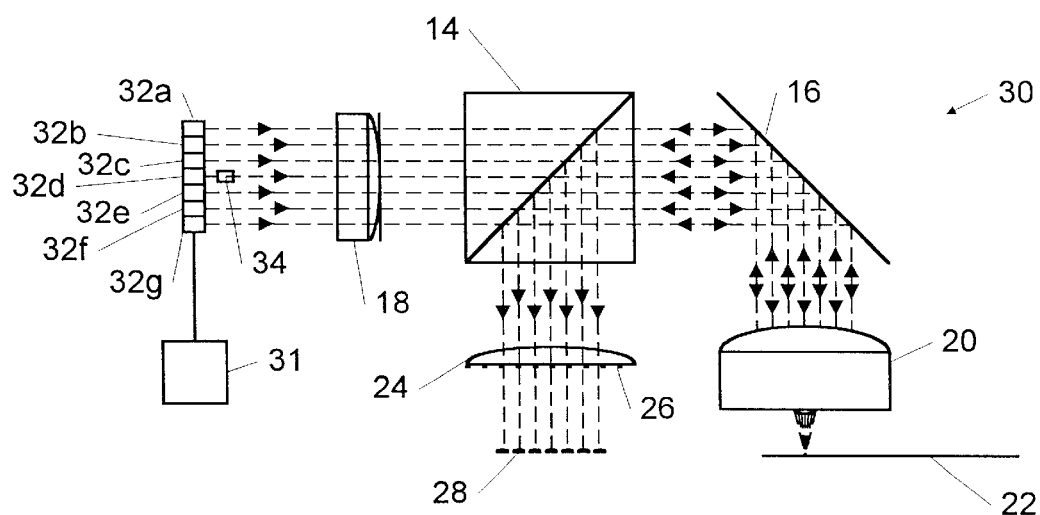
FIG. 2 is a block diagram of an optical system built in accordance with the principles of the present invention, using multiple laser diodes, one of which is powerful enough to write an optical disk.

Referring now to FIG. 2, a first embodiment of an optical system constructed in accordance with the principles of the present invention is described. It is assumed during the following description that optical disk 22 is a writable optical disk, such a DVD-RAM, or DVD-R disk. It will be apparent from the following description, however, that optical disk 22 also may be, for example, a CD-ROM or DVD-ROM disk, where it is desired to use only the read mode of operation of the optical system. Optical system 30 uses multiple laser diodes 32a–32g to generate multiple beams for simultaneously reading multiple tracks of optical disk 22 during a read mode of operation of the system.

Specifically, laser diode 32d produces, during a read mode of operation, a light beam having a power level sufficiently low to read data from optical disk 22 without modifying the data stored on the disk, e.g., 0.5 mW, and during a write mode of operation, a light beam having a power level sufficiently high to write or erase data on optical disk 22, e.g., 14 mW. The specific power levels of the light beams during the read and write,modes, of course, will depend upon the specific technology employed in optical disk 22. Alternatively, laser diode 32d may comprise two separate laser diode elements, wherein a first element emits a low power light beam during read mode, and a second element emits a higher power light beam during write mode. Laser diodes 32a–32c and 32d–32g generate light beams sufficient to read tracks on optical disk 22 during read mode, and preferably are not energized during write mode.

Processor 31, which may be a suitably programmed general purpose microprocessor or digital application-specific integrated circuit, determines whether the optical system is to operate in read mode or write mode, and issues commands to adjust the power supplied to the laser diodes. Accordingly, when multiple tracks are being read during read mode, processor 31 causes laser diodes 32a–32g all to be continuously energized to produce light beams with sufficient power to permit reading multiple tracks on optical disk 22. During the write mode of operation, when data is being written to optical disk 22, processor 31 causes laser diodes 32a–32c and 32e–32g preferably to be turned off, while causing laser diode 32d to output a beam with sufficiently high power for writing data to optical disk 22, modulated according to the data being written. If desired, processor 31 may also provide an erase mode of operation, for use with re-writable optical media such as DVD-RAM disks, in which only laser diode 32d is caused to output a beam sufficiently powerful to erase data from optical disk 22.

Figure 3:
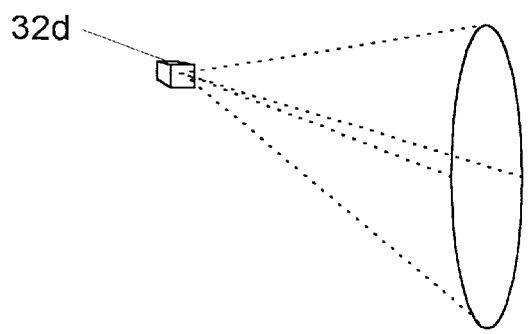
FIG. 3 illustrates asymmetric divergence of a beam produced by a typical laser diode.

With respect to FIG. 3, a light beam produced output by a typical laser diode generally has high divergence, i.e., an elliptical shape where one axis is much longer than the other. For example, the typical divergence of a beam output by a laser diode along the "narrow" axis may be under 10 degrees, while the divergence along the "wide" axis may be much greater—in the range of 25 to 65 degrees, depending on the type of laser diode. Since a highly astigmatic beam, as in FIG. 3, is unsuitable for writing data to an optical disk, it is preferable to make the light beam more circular. One solution—using a mask having a circular aperture would cause most of the beam's enerqy to be lost, with less than 20% of the beam energy passing through such aperture, thus requiring a five-fold increase in the beam power from laser diode 32d.

Accordingly, to keep the power output requirements of laser diode 32d to a reasonable level during write mode, circularizer 34 is positioned in the optical path of the beam output by laser diode 32d Circularizer 34 redistributes the energy in the light beam produced by laser diode 32d so that most of the energy is retained in the light beam. It is not necessary that circularizer 34 be used for only one of the beams. A circularizer may be common to all the laser diodes, improving the efficiency of the beams used for reading, as well as the efficiency of the beam used for writing.

Circularizer 34 may be constructed, for example, as described in U.S. Pat. No. 5,181,224 to Snyder, which is incorporated herein by reference, and such parts are commercially available from Blue Sky Research, Inc., Santa Cruz, Calif. Alternatively, a diffractive or holographic element may be used to provide circularization of the writing beam.

It will be apparent that a similar system may be constructed in which more than one of laser diodes 32a–32g may be used for writing. In such a system, multiple laser diodes produce writing beams with a power level sufficient for writing (or erasing) a track of the optical disk. Each of the writing beams is individually modulated according to the data being written, and each of the writing beams is circularized.

A combined read/write mode may also be provided in which processor 31 directs some of laser diodes 32a–32g to write data to the optical disk, while others read data from the optical disk. Such a mode may be useful, for example, in a system which simultaneously writes data to a track and verifies that data.

Figure 4:
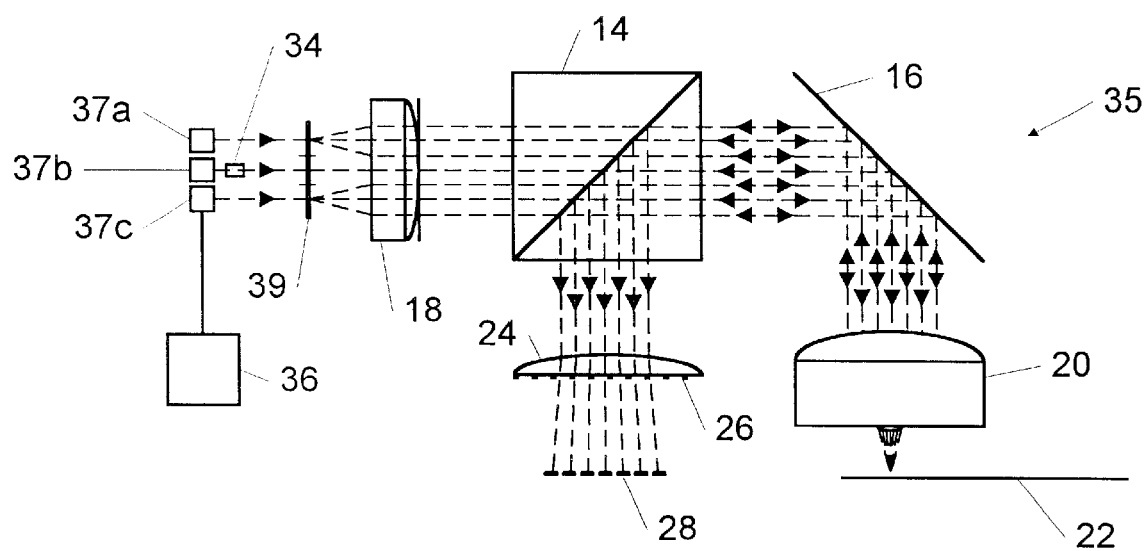
FIG. 4 is an alternative embodiment of an optical system, built in accordance with the present invention, that uses three lasers and a diffractive element.

Referring now to FIG. 4, an alternative embodiment of an optical system of the present invention is described, in which groups of laser diodes in the embodiment of FIG. 2 are replaced with a combination of a single laser diode and a diffractive element. Advantageously, optical system 35 uses only three laser diodes 37a–37c, and multi-part diffractive element 39 to generate light beams for reading data from, and writing data to, optical disk 22. Diffractive element 39 illustratively comprises outer regions, which split the light beams from laser diodes 37a and 37c into multiple beams, and a central region that circularizes the light beam emitted by laser diode 37b. Processor 36 controls operation of laser diodes 37a–37c.

In accordance with the present invention, laser diodes 37a and 37c output light beams having sufficient power so that after the light beams are split by the outer regions of diffractive element 39, the resulting light beams have enough power to read an optical disk. Laser diode 37b may be constructed as described hereinabove with respect to the embodiment of FIG. 2, and may be capable of producing light beams having different power levels, or comprise separate elements for each mode of operation.

During read mode, laser diodes 37a–37c and diffractive element 39 provide multiple light beams having sufficient power to permit the data stored in optical disk 22 to be read. During write mode, laser diodes 37a and 37c are preferably not energized, while laser diode 37b outputs a light beam having a power level sufficient for writing data, modulated according to the data being written. An erase mode also may be provided wherein laser diode 37b produces a light beam having sufficient power to erase data from-optical disk 22. A combined read/write mode may also be provided, wherein at least one laser diode outputs power sufficient for writing data, while other laser diodes output power sufficient for reading.

An exemplary embodiment of a system constructed as described with respect to FIG. 4 uses diffractive element 39 that splits the light beams from laser diodes 37a and 37c into three beams each, thereby providing six reading beams. Diffractive element 39 also includes a central portion that serves to circularize the light beam from laser diode 37b, thus providing a seventh reading beam. During the read mode of operation, such a system would be capable of simultaneously reading seven tracks of an optical disk. Care must be taken when aligning the reading beams with tracks on the optical disk, since two separate sets of diverging beams are generated by grating 39. This exemplary system also permits, during the write mode of operation, the ability to write data to an optical disk.

A similar embodiment may be constructed in which multiple laser diodes are used for simultaneously writing or erasing multiple tracks of the optical disk. Diffractive element 39 circularizes the multiple writing beams, while splitting beams produced by some of the laser diodes into multiple reading beams. Each of the multiple writing beams is individually modulated according to the data being written.

Figure 5A:
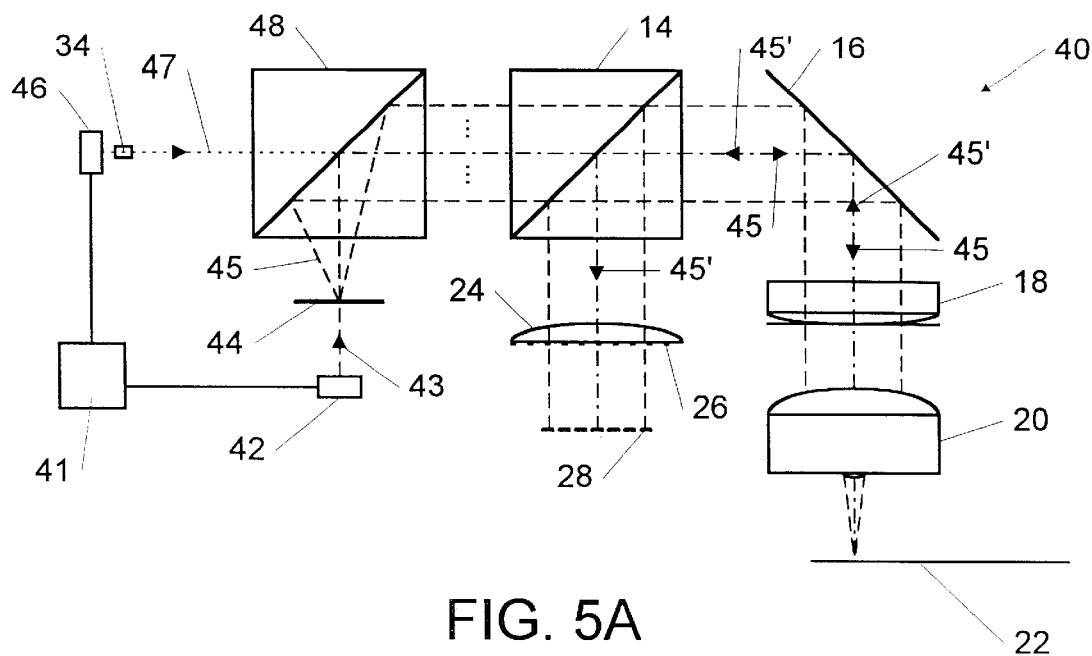
FIGS. 5A–5B are further alternative embodiments of the present invention employing two lasers and a beamsplitter.

Referring now to FIG. 5A, a further alternative embodiment of an optical system constructed in accordance with the present invention is described. Optical system 40 uses laser diode 42 to generate light beam 43 that passes through diffractive element 44 to generate plurality of reading beams 45, and laser diode 46 that generates light beam 47, which is used for writing or erasing optical disk 22. Beamsplitter 48 is used to direct the reading beams towards optical disk 22. Reflected beams 45', modulated by the data stored in optical disk 22, are directed by beamsplitter 14 through grating 26 to impinge upon detector array 28. Processor 41 controls operation of laser diodes 42 and 46.

During read mode, when data is being read from optical disk 22, laser diode 46 is off and laser diode 42 is on, outputting light beam 43 that is sufficiently powerful to permit the plurality of reading beams 45 generated by diffractive element 44 to read data stored on optical disk 22. During write or erase mode, when data is being written or erased on optical disk 22, laser diode 42 is off, and laser diode 46 is on, outputting light beam 47 sufficiently powerful to permit writing or erasing of data on the optical disk.

Beamsplitter 48 is preferably a polarizing beamsplitter, and laser diodes 42 and 46 are preferably adjusted so that the polarization of light beam 43 is perpendicular to the polarization of light beam 47. This configuration permits beamsplitter 48 to reflect almost all the energy of reading beams 45, while allowing almost All the energy of light beam 47 to pass through beamsplitter 48. If beamsplitter 48 is not a polarizing beamsplitter, the optical efficiency of system 40 will be substantially reduced, requiring the use of laser diodes which output higher power light beams than the laser diodes used in other embodiments described hereinabove.

In addition to having separate read and write modes, the embodiment of the present invention disclosed with reference to FIG. 5A may have a mode in which laser diodes 46 and 42 are both on, permitting simultaneous reading and writing of the optical disk. In this combined read/write mode, multiple tracks of the optical disk are read simultaneously, while a single track of the optical disk is written or erased. By slightly offsetting the paths of beams 47 and 43, the reading beams may read data from the optical disk slightly ahead of the position of the writing beam, or slightly behind the position of the writing beam.

Additionally, optical system 40 may be altered to simultaneously write multiple tracks of an optical disk by replacing laser diode 46 with a plurality of laser diodes, each of which produces a beam suitable for writing or erasing a track on an optical disk. Each of these beams is individually modulated during write mode according to the data being written. During a combined read/write mode, multiple tracks may be written while multiple tracks are simultaneously read.

Figure 5B:
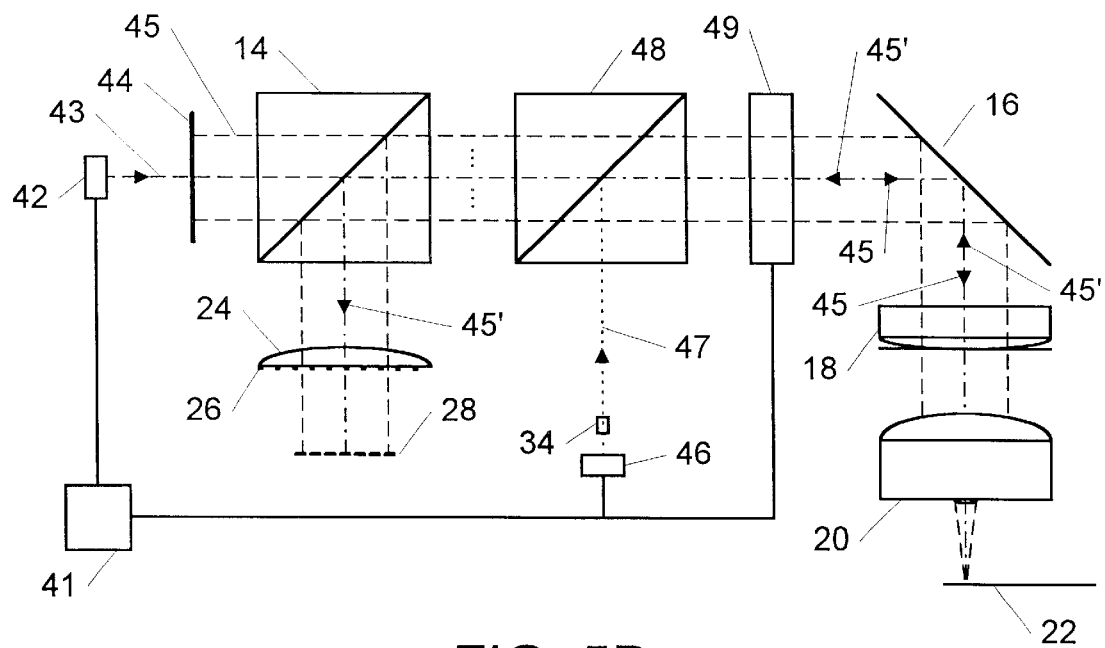

A more efficient version of the embodiment of FIG. 5A is described with reference to FIG. 5B. In this embodiment, beamsplitter 48 is a polarizing beamsplitter (PBS), and is placed after beamsplitter 14 in the optical path of reading beams 45. The placement of beamsplitter 48, in combination with the use of a PBS, permits the system to direct writing beam (or beams) 47 toward optical disk 22 with high efficiency.

During write mode, the beam reflected from optical disk 22 must have its polarization rotated so that it will pass through beamsplitter 48, instead of being directed back towards laser diode 46. By placing quarter wave plate (QWP) 49 in the path of writing beam 47, the polarization of writing beam 47 is rotated, permitting it to pass through beamsplitter 48, and to be directed towards detector array 28 (for servo control) by beamsplitter 14.

During read mode, the beams already have the polarization needed to pass through beamsplitter 48, so reading beams 45 and reflected beams 45' must not pass through QWP 49. This can be achieved by using a servo system coupled to processor 41 to move QWP 49 out of the optical path during read mode, and into the optical path during write mode.

A similar effect may be achieved by replacing QWP 49 with an electronically switched liquid crystal phase plate (LQPP) coupled to processor 41. An LQPP can selectively cause a quarter wavelength phase shift, providing the same polarization rotation as QWP 49, or it can cause a full wavelength phase shift, leaving the polarization of light passing through the LQPP unchanged. In write mode, processor 41 would provide a voltage level to the LQPP sufficient to cause a quarter wavelength phase shift. In read mode, processor 41 would provide a voltage level to the LQPP sufficient to cause a full wavelength phase shift.

Figure 6:
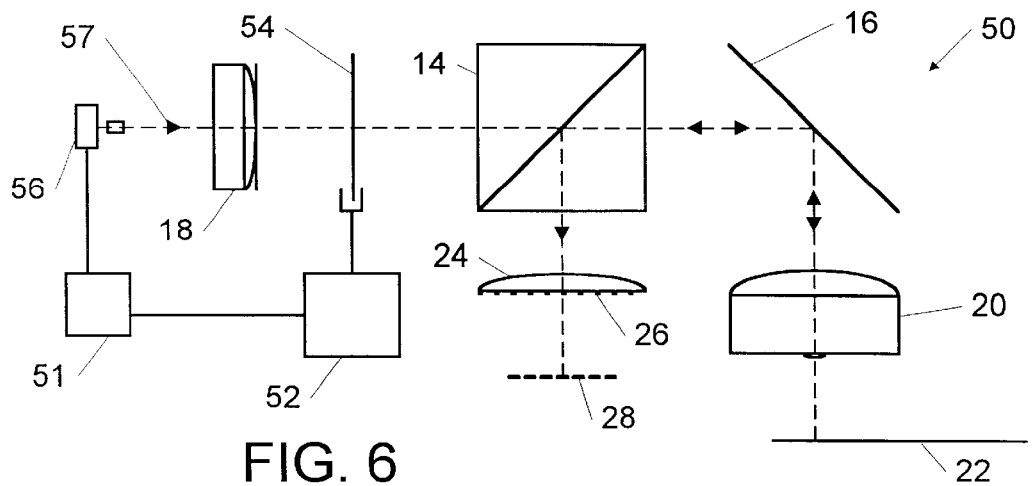
FIG. 6 is another alternative embodiment of the present invention that uses a mechanically removable diffractive element.

With respect to FIG. 6, another embodiment of an optical system built in accordance with the principles of the present invention is described. In optical system 50, actuator 52 moves diffractive element 54 into or out of the optical path of light beam 57 produced by laser diode 56 responsive to commands issued by processor 51. Processor 51 also controls the power level supplied to laser diode 56.

When system 50 is reading data from optical disk 22, diffractive element 54 is positioned in the path of light beam 57 and splits light beam 57 into a plurality of reading beams. When data is written or erased on optical disk 22, actuator 52 moves diffractive element 54 out of the optical path, so that light beam 57 from laser diode 56 is used directly for writing or erasing data.

As will of course be apparent to one of skill in the art of optical disk systems, the power level of light beam 57 generated by laser diode 56 must be capable of being modulated to provide the various power levels appropriate for reading, writing, and erasing data on optical disk 22. In addition, actuator 52 must position diffractive element 54 in the path of light beam 57 with high accuracy, to ensure that the reading beams generated by diffractive element 54 are properly, aligned with the tracks on the optical disk. Because mechanical movement of diffractive element 54 in system 50 may take several milliseconds, this embodiment may not be suitable for drives that require the capability to switch rapidly between reading and writing modes of operation.

Figure 7A:
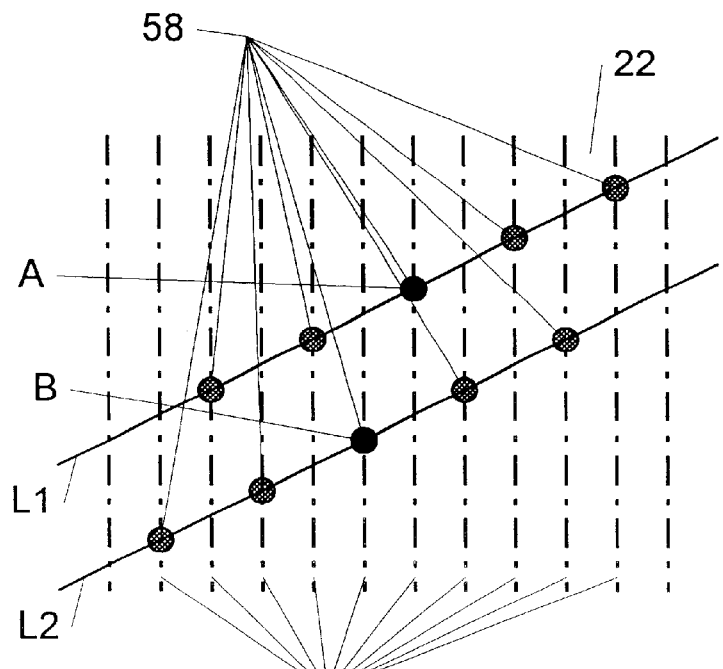
FIGS. 7A–B show staggered beam patterns used to read and write multiple tracks of an optical disk.
Figure 7B:
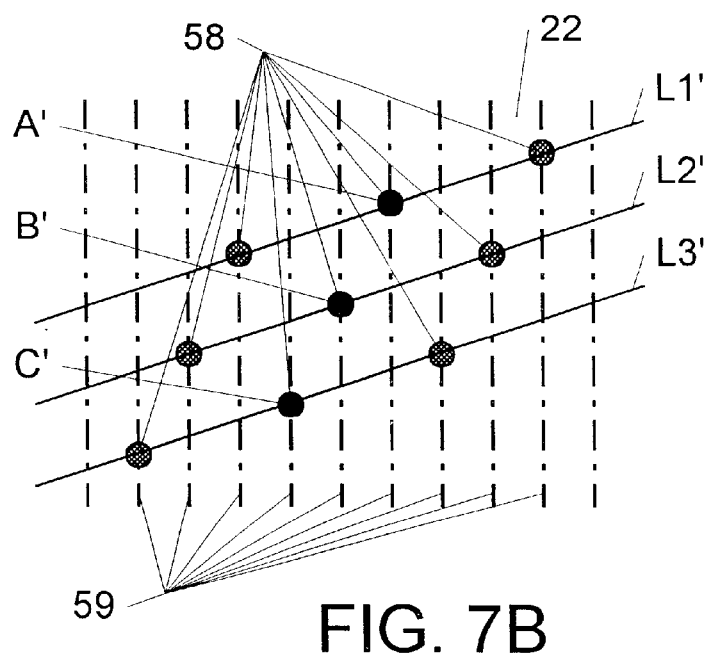

By replacing laser diode 56 with a plurality of laser diodes, system 50 will be able to simultaneously write multiple tracks of optical disk 22 during write mode. During read mode, diffractive element 54 may be used to split each of the beams into a plurality of beams, having a staggered arrangement, such as is shown in FIGS. 7A–7B. A limited combined read/write mode may also be provided, wherein diffractive element 54 is not in the optical path of the beams, and one or more of the plurality of laser diodes are used for writing while one or more of the plurality of laser diodes are used for reading.

FIG. 7A shows an example arrangement of beams 58 projected onto tracks 59 of optical disk 22. Beams 58 are arranged in two lines, L1 and L2, each having five beams. Lines L1 and L2 are staggered, so that a total of ten tracks are simultaneously read by beams 58 in read mode. In write mode, beams A and B simultaneously write two tracks of optical disk 22. Such an arrangement could be achieved by using two laser diodes, and a diffractive element which splits each of the beams produced by the laser diodes into five reading beams, along one of lines L1 or L2 during read mode.

In FIG. 7B, an alternative arrangement of beams 58 is shown, in which beams 58 are arranged in three lines, L1', L2', and L3', with three beams per line, so that a total of nine tracks are simultaneously read during read mode. In write mode, beams A', B', and C' simultaneously write three tracks of optical disk 22. Such an arrangement could be achieved by using three laser diodes, and a diffractive element which splits each of the beams produced by the laser diodes into three reading-beams.

It will be apparent that by varying the number of laser diodes used, and the parameters of the diffractive element, numerous different staggered arrangements of beams similar to those shown in FIGS. 7A–7B may be achieved. The number of tracks which may be simultaneously written will depend on the number of laser diodes used, and is limited by the ability of the system to dissipate the heat generated by the laser diodes. The number of tracks which may be simultaneously read will be the product of the number of laser diodes and the number of diffractive orders produced from each beam by the diffractive element.

Figure 8:
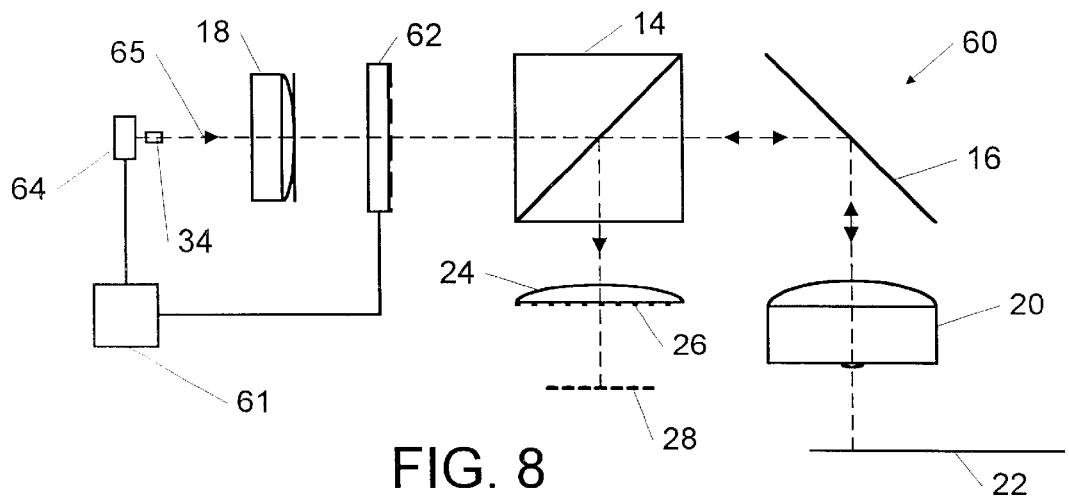
FIG. 8 is a still further embodiment of the present invention that uses a switchable liquid crystal diffractive element.

In FIG. 8, a still further alternative embodiment of an optical system is described, wherein motion effects associated with the embodiment of FIG. 6 are solved. In optical system 60, diffractive element 54 and actuator 52 are replaced by liquid crystal diffractive element 62. Processor 61 controls both the operation of laser diode 64 as well as the application of an electric field to liquid crystal diffractive element 62. As is well known, liquid crystals are capable of undergoing a change in refractive index in the presence of an electric field. Liquid crystal diffractive element 62 exploits this property, and contains regions arranged to form a phase grating that refract incident light when an electric field is applied.

Liquid crystal diffractive element 62 therefore functions as a beamsplitter that splits light beam 65 output by laser diode 64 into multiple reading beams when the electric field is applied, and permits most of light beam 65 to pass unaffected through the liquid crystal when in the absence of an applied field. Liquid crystal diffractive elements are described in greater detail, for example, in U.S. Pat. No. 3,843,231 to Borel et al, while reconfigurable beamsplitting liquid crystal diffractive elements are described in U.S. Pat. No. 5,650,835 to Matic, both of which are incorporated herein by reference. Liquid crystal diffractive elements suitable for use in an optical system built in accordance with the present invention are commercially available from Fabia Engineering Ltd., Israel.

By turning liquid crystal diffractive element 62 "on" during read mode, light beam 65 from laser diode 64 is split into multiple reading beams, thereby enabling the system to simultaneously read a plurality of tracks on optical disk 22. During write mode, when data is being written or erased, liquid crystal diffractive element 62 is turned "off", thus allowing light beam 65 from laser diode 64 to pass through unaffected.

As will be apparent from the foregoing, laser diode 64 must generate light beam 65 to have sufficient power to read data from optical disk 22 after the beam has been split into multiple reading beams, and to write or erase data on optical disk 22. It is expected that a liquid crystal diffractive element having a switching time on the order of about 20 microseconds will provide sufficient speed for most applications that require rapid switching between reading and writing modes of operation.

By using multiple laser diodes, system 60 may be modified to simultaneously write multiple tracks of an optical disk during write mode. Staggered arrangements of beams similar to those shown with reference to FIGS. 7A–7B may be produced by using multiple laser diodes in conjunction with a liquid crystal diffractive element. Also, a limited combined read/write mode may be implemented, wherein liquid crystal diffractive element 62 is "off", and one or more of the multiple laser diodes is used for writing, while one or more of the multiple laser diodes is used for reading.

Figure 9:
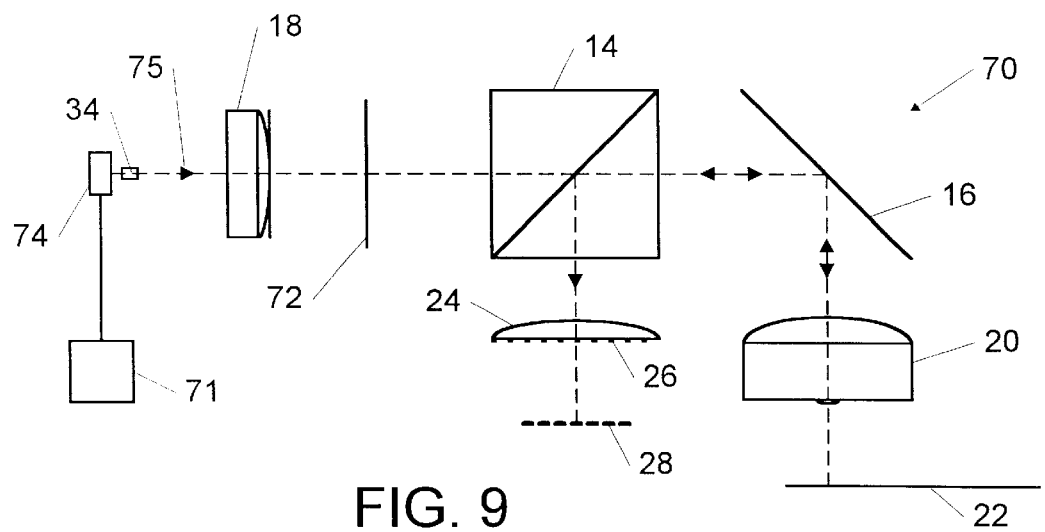
FIG. 9 is a yet another embodiment of the present invention that uses a single laser and a diffractive element.

Referring now to FIG. 9, yet another preferred embodiment of an optical system of the present invention is described. Optical system 70 employs diffractive element 72 that has an efficiency profile that concentrates energy into the central beam. Specifically, diffractive element 72 splits light beam 75 produced by laser diode 74 to have the energy profile depicted in FIGS. 10A–10C. Thus, when the central beam has enough power to write data to optical disk 22, the other beams will not have enough power to write or erase the disk. However, when the central beam is used to read the optical disk, the other beams still have enough power to be used for simultaneously reading other tracks of the disk. Processor 71 controls operation of laser diode 74.

Figure 10A:
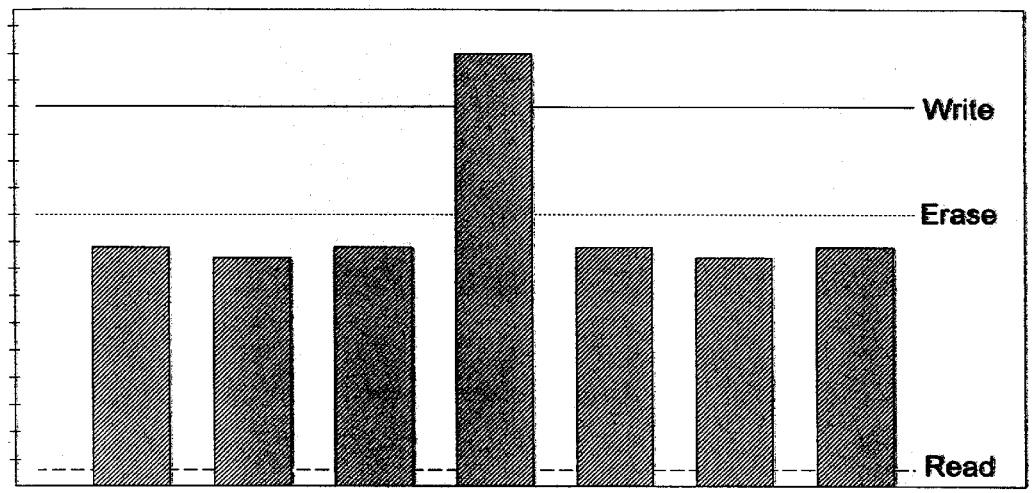
FIGS. 10A–C depict the distribution of power in the beams produced by the diffractive element of the optical system of FIG. 8 when the system is writing, erasing, and reading, respectively.

In FIG. 10A, when the system is writing data to an optical disk, the central beam produced by diffractive element 72 is above the threshold power level required for writing, but all of the other beams are below the threshold required for erasing data from the disk. While the output of laser diode 74 may be modulated according to data to be written to the optical disk, and all beams generated by diffractive element 72 are so modulated, only the central beam has sufficiently high power to cause data to be written to optical disk 22.

Figure 10B:
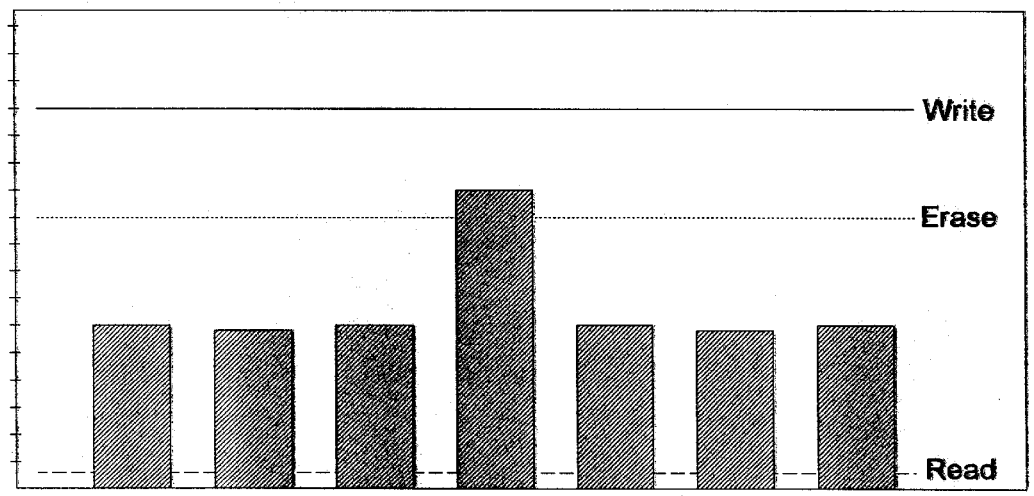

In FIG. 10B, if an erase mode of operation is desired, the output of laser diode 74 is reduced so that only the central beam generated by diffractive element 72 is above the threshold power level required to erase data, but below the threshold required for writing. In this case, the other beams generated by diffractive element 72 are all below the threshold power level for erasing data from other tracks of the optical disk.

Figure 10C:
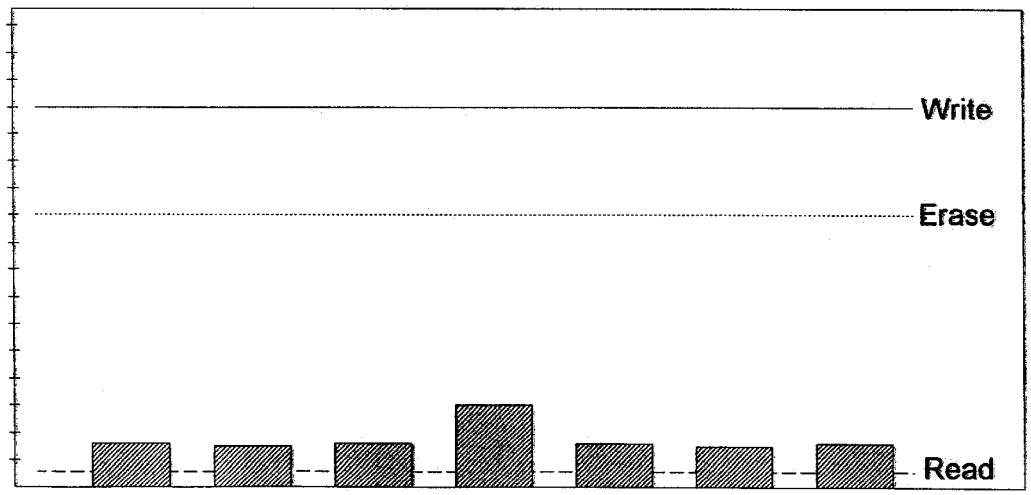

In FIG. 10C, during a read mode of operation of the system, the central beam produced by diffractive element 72 has a higher power level than any of the other beams, but all of the beams have power levels below the power threshold required to erase data and above the power threshold required to read data.

A phase grating, or phase-amplitude grating having the efficiency profile shown in table 1 below is expected to produce the beam power configuration described hereinabove with respect to FIGS. 9A–9C.

TABLE 1

| Beam | Efficiency division after gratings in % | |
|---|---|---|
| | Phase | Phase-amplitude |
| 1 | 11.47 | 11.86 |
| 2 | 10.48 | 12.18 |
| 3 | 10.96 | 12.10 |
| 4 | 19.66 | 17.48 |
| 5 | 10.96 | 13.00 |
| 6 | 10.48 | 11.24 |
| 7 | 11.47 | 12.12 |
| Total: | 85.48 | 89.98 |

A grating having an efficiency profile such as is shown in Table 1 may also be advantageously used in a system which simultaneously writes multiple tracks of an optical disk. When multiple laser diodes are used with such a grating, staggered patterns of beams, such as those shown with reference to FIGS. 7A–7B may be generated. The grating concentrates a disproportionate portion of the energy from each of the laser diodes into the central beam of each of the lines of beams, permitting the central beam of each line to write or erase a track of an optical disk during write or erase mode. During read mode, each of the beams, including the central beam of each line only has power sufficient to read an optical disk. A combined read/write mode may also be provided, wherein one or more of the central beams is used for writing, while at least one beam, possibly a central beam, is used for reading data from the optical disk.

In general, the efficiency profile for a diffractive element producing an acceptable beam power configuration can be approximated by a few simple relations. Let $E_r$ be the beam power threshold for reading, $E_w$ be the beam power threshold for writing, $E_e$ be the beam power threshold for erasing, P be the beam power of the beam which is capable of writing or erasing, and assume that all of the diffractive orders used for reading have approximately equal efficiencies, and that k is the coefficient relating the efficiency of the writing beam to the efficiencies of the reading beams (so the reading beams have power P/k). It is also assumed that $E_r < E_e < E_w$, and that k>1. When writing, the following conditions hold:

$$P > E_w$$

$$P/k < E_e$$

When erasing, the following conditions hold:

$$P > E_e$$

$$P < E_w$$

$$P/k < E_e$$

When reading, the following conditions hold:

$$P > E_r$$

$$P < E_e$$

$$P/k > E_r$$

solving these inequalities to put boundaries on the value of k yields:

$$E_w/E_e < k < E_e/E_r$$

So, for example, for $E_w$=14 mW, $E_e$=10 mW, and $E_r$=0.5 mW, k would be between 1.4 and 20, meaning that the efficiency of the writing beam would be anywhere between 1.4 and 20 times the efficiency of the reading beams. The coefficient k used for the example shown in table 1 is approximately 1.8.

While preferred-illustrative embodiments of the present invention are described above, it will be evident to one skilled in the art that various changes and modifications may be made without departing from the invention. For example, systems employing different numbers of reading or writing beams, or having somewhat different arrangement of lenses could be constructed. It is intended in the appended claims to cover all such changes and modifications which fall within the true spirit and scope of the invention.

What is claimed is:

1. An optical system for use in an optical disk drive that simultaneously reads multiple tracks of an optical disk, the optical system comprising:

a laser diode providing a light beam;
a diffractive element disposed between the laser diode and the optical disk;
an actuator coupled to the diffractive element, the actuator moving the diffractive element from a first position in a path of the light beam to provide a plurality of reading beams during a read mode, to a second position outside of the path of the light beam to provide a writing beam during a write mode;
a plurality of detector elements, each detector element disposed to accept a corresponding reading beam reflected from one of the multiple tracks of the optical disk; and
a processor coupled to the laser diode to selectively control operation of the laser diode so that during the write mode the light beam has a power level sufficient to write data to a track of the optical disk, and during the read mode the reading beams have a sufficient power level to read the multiple data tracks of the optical disk but insufficient power to write data to a track of the optical disk.

2. The optical system as defined in claim 1, wherein the diffractive element splits the light beam during the read mode to form a staggered pattern of reading beams.

3. An optical system for use in an optical disk drive that simultaneously reads multiple tracks of an optical disk, the optical system comprising:
a laser diode providing a light beam;
a liquid crystal diffractive element for splitting the light beam into a plurality of reading beams during a read mode;
a lens that focuses the plurality of reading beams onto corresponding tracks of the multiple tracks of the optical disk;
a plurality of detector elements, each detector element disposed to accept a corresponding reading beam reflected from one of the multiple tracks of the optical disk; and
a processor coupled to the laser diode to selectively control operation of the laser diode so that during a write mode the light beam has a power level sufficient to write data to a track of the optical disk, and during the read mode the reading beams have a sufficient-power level to read the multiple data tracks of the optical disk but insufficient power to write data to a track of the optical disk.

4. An optical system for use in an optical disk drive that simultaneously reads multiple tracks of an optical disk, the optical system comprising:
a laser diode providing a light beam;
a diffractive element that splits the light beam into a plurality of beams, including a writing beam and a plurality of reading beams, the ratio of the power of the writing beam to the power of each reading beams being greater than 1.0;
a plurality of detector elements, each detector element disposed to accept a corresponding one of the plurality of beams reflected from one of the multiple tracks of the optical disk; and
a processor coupled to the laser diode to selectively control operation of the laser diode so that during the write mode the writing beam has a power level sufficient to write data to a track of the optical disk, and during the read mode the reading beams and the writing beam have a power level only sufficient to read the multiple data tracks of the optical disk but insufficient power to write data to the optical disk.

5. The optical system as defined in claim 4, wherein the processor controls the laser diode so that during an erase made the writing beam has a power level sufficient to erase data from a track of the optical disk and none of the plurality of reading beams has a sufficient power level to erase data from the optical disk.

6. The optical system as described in claim 5, wherein the ratio of the power of the writing beam to the power of each one of the plurality of reading beams satisfies:

$$E_w/E_e < k < E_e/E_r$$

where:
$E_w$ is a threshold power required for writing an optical disk;
$E_e$ is a threshold power required for erasing an optical disk;
$E_r$ is a threshold power required for reading an optical disk; and
k is the ratio of the power of the writing beam to the power of each one of the plurality of reading beams.

7. A method for use in an optical disk drive that simultaneously reads multiple tracks of an optical disk, the method comprising:
generating a light beam;
selectively switching between a read mode and a write mode;
selectively splitting the light beam into a plurality of reading beams during the read mode;
selectively controlling the modulation of the light beam during the write mode; and
generating a plurality of data signals during the read mode corresponding to reading beams reflected from corresponding ones of the multiple tracks of the optical disk.

8. The method of claim 7, further comprising splitting a plurality of light beams during the read mode to form a staggered arrangement of reading beams.

9. The method of claim 7, wherein selectively splitting the light beam comprises moving a diffractive element into a first position within a path of the light beam during the read mode and moving the diffractive element into a second position outside the path of the first light beam during the write mode.

10. The method of claim 7, wherein selectively splitting the light beam comprises controlling a liquid crystal diffractive element so that during the read made the light beam is split into the plurality of reading beams and the light beam is not split into the plurality of reading beams during the write mode.

11. A method for use in an optical disk drive that simultaneously reads multiple tracks of an optical disk, the method comprising:
generating a light beam;
selectively switching between a read mode and a write mode;
splitting the light beam into a plurality of beams, including a writing beam and a plurality of reading beams, the ratio of the power of the writing beam to the power of each reading beam being greater than 1.0;
generating a plurality of data signals during the read mode corresponding to the plurality of beams reflected from corresponding ones of the multiple tracks of the optical disk; and operating the laser diode so that during the write mode the writing beam has a power level sufficient to write data to a track of the optical disk, and during the read mode the reading beams and the writing beam have a power level only sufficient to read the multiple data tracks of the optical disk but insufficient to write data to the optical disk.

12. The method of claim 11 wherein:

selectively switching between a read mode and a write mode further comprises selectively switching between the read mode, the write mode, and an erase made; and operating the laser diode further comprising operating the laser diode such that only the writing beam is sufficiently powerful to erase the optical disk in the erase mode.

13. The method of claim 12, wherein the ratio of the power of the writing beam to the power of each one of the plurality of reading beams satisfies:

$$E_w/E_e < k < E_e/E_r$$

where:

$E_w$ is a threshold power required for writing an optical disk;

$E_e$ is a threshold power required for erasing an optical disk;

$E_r$ is a threshold power required for reading an optical disk; and k is the ratio of the power of the writing beam to the power of each one of the plurality of reading beams.

\* \* \* \* \*